(12) United States Patent
Ikeda

(10) Patent No.: US 11,140,284 B2
(45) Date of Patent: Oct. 5, 2021

(54) IMAGE FORMING SYSTEM EQUIPPED WITH INTERACTIVE AGENT FUNCTION, METHOD OF CONTROLLING SAME, AND STORAGE MEDIUM

(71) Applicant: CANON KABUSHIKI KAISHA, Tokyo (JP)

(72) Inventor: Satoru Ikeda, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/554,778

(22) Filed: Aug. 29, 2019

(65) Prior Publication Data
US 2020/0076969 A1   Mar. 5, 2020

(30) Foreign Application Priority Data

Sep. 4, 2018 (JP) .............................. JP2018-165379
Jun. 28, 2019 (JP) .............................. JP2019-121813

(51) Int. Cl.
*H04N 1/00* (2006.01)
*G06F 3/12* (2006.01)

(52) U.S. Cl.
CPC ....... *H04N 1/00403* (2013.01); *G06F 3/1204* (2013.01); *G06F 3/1254* (2013.01); *H04N 1/00395* (2013.01); *H04N 1/00482* (2013.01); *G06F 3/1288* (2013.01)

(58) Field of Classification Search
CPC .......................... H04N 1/00403; G06F 3/1204
See application file for complete search history.

(56) References Cited

U.S. PATENT DOCUMENTS

| | | | |
|---|---|---|---|
| 9,548,050 B2 | 1/2017 | Gruber | |
| 2003/0004728 A1* | 1/2003 | Keiller | G06F 3/16 704/275 |
| 2011/0141516 A1* | 6/2011 | Niitsuma | G06F 3/128 358/1.15 |
| 2015/0317109 A1* | 11/2015 | Kirihata | G06F 3/167 358/1.15 |
| 2019/0349488 A1* | 11/2019 | Chitpasong | H04N 1/00403 |

FOREIGN PATENT DOCUMENTS

JP          2014222513 A          11/2014

* cited by examiner

*Primary Examiner* — Ibrahim Siddo
(74) *Attorney, Agent, or Firm* — Rossi, Kimms & McDowell LLP

(57) ABSTRACT

An image forming system capable of improving the usability of an interactive agent function. The image forming system receives voice input thereto as an instruction related to execution of a job. The image forming system executes a job based on settings indicated by voice input thereto, and in a case where a specific word is included in the input voice, the image forming system executes the job based on a plurality of types of settings registered in advance in association with the specific word.

15 Claims, 16 Drawing Sheets

FIG. 8

| FUNCTION | MIDDLE HIERARCHY ITEM | BOTTOM HIERARCHY ITEM |
|---|---|---|
| COPY | SETTINGS | COLOR SELECTION, DIRECT, MAGNIFICATION, SHEET SELECTION, ORIENTATION OF DOCUMENT, DOUBLE-SIDED, DOCUMENT TYPE, CONCENTRATION, N-in-1 PRINTING, FINISHING, PAGE PRINTING, DATE PRINTING, STAMP, NUMBER-OF-COPIES PRINTING, ONE-TOUCH ADJUSTMENT, COLOR ADJUSTMENT, JOB LOCK, COPY-FORGERY-INHIBITED PATTERN PRINTING, SHARPNESS, FRAME DELETION, MOVE, ID CARD COPY |
| FAX | SETTINGS | NUMBER OF DESTINATIONS, DESTINATION, RESOLUTION, READING SIZE, ON-HOOK, DIRECT TRANSMISSION, ADDRESS BOOK, TONE, F-CODE |
| SCAN-AND-TRANSMISSION | TRANSMISSION SETTINGS | ADDRESS BOOK, DESTINATION (To, Cc, Bcc), COLOR SELECTION, RESOLUTION, READING SIZE, FILE FORMAT, DOUBLE-SIDED, ORIENTATION OF DOCUMENT, DESTINATION LIST, DETAILED INFORMATION, DESTINATION DELETION |
| | ADDRESS BOOK | SWITCHING OF ADDRESS BOOK, INITIAL CHARACTER SEARCH, NAME SEARCH |
| SCAN-AND-SAVE (NETWORK) | STORAGE SELECTION | STORAGE INFORMATION CONFIRMATION |
| | FILE SELECTION | SORTING, IMAGE DISPLAY, FOLDER OPERATION, DOCUMENT READING, FILE EDITING |
| | FILE EDITING | DETAILED INFORMATION, DELETION, CHANGE OF FILE NAME |
| | READING SETTINGS | RESOLUTION, READING SIZE, FILE FORMAT, DOCUMENT TYPE, FILE NAME, SHARPNESS, FRAME DELETION, RETURNING TO DEFAULT SETTINGS, ORIENTATION, DOUBLE-SIDED, COLOR SELECTION |
| SCAN-AND-SAVE (MEMORY MEDIUM) | MEMORY MEDIUM SELECTION | MEDIUM INFORMATION CONFIRMATION |
| | FILE SELECTION | DESELECTION, SORTING, IMAGE DISPLAY, FOLDER OPERATION, DOCUMENT READING, FILE EDITING |
| | FILE EDITING | DETAILED INFORMATION, DELETION, CHANGE OF FILE NAME |
| | READING SETTINGS | RESOLUTION, READING SIZE, FILE FORMAT, DOCUMENT TYPE, FILE NAME, SHARPNESS, FRAME DELETION, RETURNING TO DEFAULT SETTINGS, ORIENTATION, DOUBLE-SIDED, COLOR SELECTION |
| USE OF STORED FILE | FILE SELECTION | FILE SELECTION, FILE SORTING, IMAGE DISPLAY, FILE EDITING, DETAILED INFORMATION, DELETION, CHANGE OF FILE NAME |
| | READING SETTINGS | RESOLUTION, READING SIZE, FILE FORMAT, DOCUMENT TYPE, INPUT OF FILE NAME, SHARPNESS, FRAME DELETION, ORIENTATION OF DOCUMENT, DOUBLE-SIDED, COLOR SELECTION |
| | PRINT SETTINGS | ALL PAGES, PAGE DESIGNATION, CHANGE OF NUMBER OF COPIES, RETURNING TO DEFAULT SETTINGS, FINISHING, DOUBLE-SIDED, COLOR SELECTION |
| RECEPTION TRAY | SYSTEM BOX | FILE SELECTION, DETAILED INFORMATION, DELETION, FAX MEMORY RECEPTION, PRINT, TRANSMISSION, MEMORY RECEPTION, ADDRESS BOOK, INPUT OF DESTINATION, FILE DELETION AFTER TRANSMISSION, DESTINATION (To, Cc, Bcc), DESTINATION LIST, DESTINATION DELETION, DETAILED INFORMATION DIVISION LIST |
| SECURE PRINT | SETTINGS | FILE SELECTION, INPUT OF PASSWORD |
| PRINTING (INCLUDING RESERVATION PRINTING) | BASIC SETTINGS | OUTPUT SHEET SIZE, ORIENTATION OF PRINT, LAYOUT PRINTING, DOUBLE-SIDED PRINTING, BOOKBINDING PRINTING, SORT, GROUP, MONOCHROME PRINTING, COLOR/MONOCHROME PRINTING, TWO-COLOR PRINTING |
| | PAGE SETTINGS | OUTPUT SHEET SIZE, ORIENTATION OF PRINT, LAYOUT PRINTING, STAMP PRINTING, PAGE FRAME, HEADER/FOOTER |
| | FINISHING SETTINGS | DOUBLE-SIDED PRINTING, BOOKBINDING PRINTING, MIXED IN SIZE & ORIENTATION, SORT, GROUP |
| | SHEET FEEDING SETTINGS | DESIGNATION OF SHEET |
| | PRINT QUALITY | PURPOSE OF PRINTING, TONER SAVING, MONOCHROME PRINTING, AUTOMATIC SWITCHING BETWEEN COLOR & MONOCHROME |
| | COMMON FUNCTIONS | FAVORITES, ADDITION/EDITION OF FAVORITES, CHANGE OF OUTPUT METHOD, PREVIEW, SETTINGS CONFIRMATION |
| | DEVICE SETTINGS | OPTION SETTINGS, ACQUISITION OF DEVICE INFORMATION, DISPLAY OF VERSION INFORMATION |

FIG. 11

| # | USER | PRESET NAME | FUNCTION | SETTING ITEM 1 | SETTING ITEM 2 | SETTING ITEM 3 | SETTING ITEM 4 | SETTING ITEM 5 |
|---|---|---|---|---|---|---|---|---|
| 1 | a | MEETING IN TEAM | COPY | 4in1 | COLOR | DOUBLE-SIDED | | |
| 2 | a | TEAM MEMBER | SCAN-AND-TRANSMISSION | aaa_reiwa@aaa.co.jp | A4 | COLOR | .pdf | |
| 3 | b | IN-OFFICE | FAX | 0123456789 | A4 | DIRECT TRANSMISSION | | |
| 4 | c | MEETING IN TEAM | COPY | 2in1 | A4 | MONOCHROME | DOUBLE-SIDED | STAPLING |
| 5 | a | TEAM MEMBER MONOCHROME | SCAN-AND-TRANSMISSION | aaa_reiwa@aaa.co.jp | A4 | MONOCHROME | .pdf | |

1100

IMAGE FORMING SYSTEM EQUIPPED WITH INTERACTIVE AGENT FUNCTION, METHOD OF CONTROLLING SAME, AND STORAGE MEDIUM

BACKGROUND OF THE INVENTION

Field of the Invention

The present invention relates to an image forming system equipped with an interactive agent function, a method of controlling the same, and a storage medium.

Description of the Related Art

There is known an MFP as a voice interaction apparatus equipped with an interactive agent function. This MFP receives voice uttered by a user as a job setting instruction, a job execution instruction, or the like, using the interactive agent function (see e.g. Japanese Laid-Open Patent Publication (Kokai) No. 2014-222513). This enables the user to easily provide a job setting instruction, a job execution instruction, and so forth, only by uttering the content of the instruction without operating a console section of the MFP.

However, in the conventional technique, in a case where a user provides an instruction for executing a job which requires a plurality of types of settings to be set therefor, by using the interactive agent function, the user is required to utter the plurality of types of settings, which lowers the usability of the function.

SUMMARY OF THE INVENTION

The present invention provides an image forming system capable of improving the usability of an interactive agent function, a method of controlling the same, and a storage medium.

In a first aspect of the present invention, there is provided image forming system comprising an image forming device configured to form an image on a sheet, a microphone capable of receiving voice, and at least one controller configured to function as a first unit configured to associate at least one image formation setting acquired based on a first voice input via the microphone with identification information acquired based on a second voice input via the microphone, and a second unit configured to acquire the at least one image formation setting associated with the identification information, based on a third voice input via the microphone, and cause the image forming device to execute image formation at least based on the acquired at least one image formation setting.

In a second aspect of the present invention, there is provided a method of controlling an image forming system including an image forming device configured to form an image on a sheet, and a microphone capable of acquiring voice, comprising associating at least one image formation setting acquired based on a first voice input via the microphone with identification information acquired based on a second voice input via the microphone, and acquiring the at least one image formation setting associated with the identification information, based on a third voice input via the microphone, and causing the image forming device to execute image formation at least based on the acquired at least one image formation setting.

In a third aspect of the present invention, there is provided a non-transitory computer-readable storage medium storing a computer-executable program for executing a method of controlling an image forming system including an image forming device configured to form an image on a sheet, and a microphone capable of acquiring voice, wherein the method comprises associating at least one image formation setting acquired based on a first voice input via the microphone with identification information acquired based on a second voice input via the microphone, and acquiring the at least one image formation setting associated with the identification information, based on a third voice input via the microphone, and causing the image forming device to execute image formation at least based on the acquired at least one image formation setting.

According to the present invention, it is possible to improve the usability of the interactive agent function.

Further features of the present invention will become apparent from the following description of exemplary embodiments (with reference to the attached drawings).

BRIEF DESCRIPTION OF THE DRAWINGS

FIG. 8 is a diagram showing an example of function settings information which can be set by the MFP appearing in FIG. 1.

FIG. 11 is a diagram showing an example of a management table managed by the MFP appearing in FIG. 1.

DESCRIPTION OF THE EMBODIMENTS

The present invention will now be described in detail below with reference to the accompanying drawings showing embodiments thereof. Although in an embodiment described hereafter, the present invention is applied to an MFP as an image forming system, the present invention is not limitedly applied to the MFP. For example, the present invention may be applied to an apparatus equipped with an interactive agent function, such as a smart speaker, a smart phone, a tablet terminal, and a PC.

Figure 1:
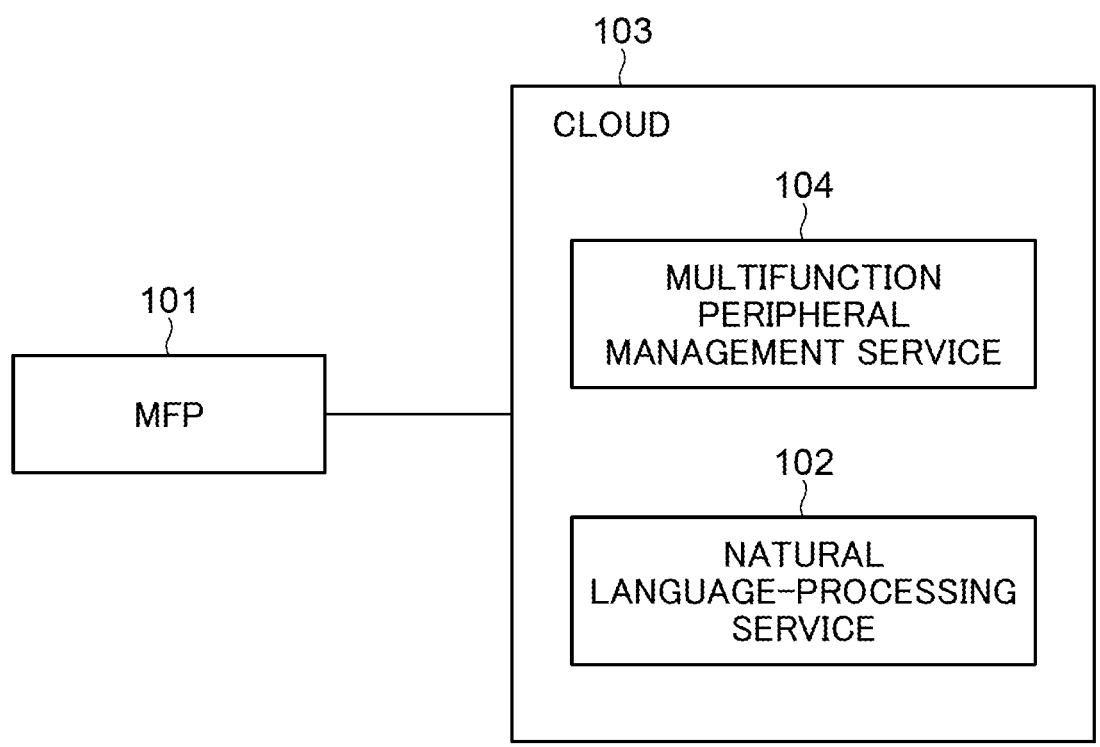
FIG. 1 is a diagram useful in explaining an interactive agent function equipped in an MFP as an image forming system according to an embodiment of the present invention.

FIG. 1 is a diagram useful in explaining the interactive agent function equipped in the MFP, denoted by reference numeral 101, which is the image forming system according to the embodiment of the present invention. The MFP 101 as the image forming apparatus performs an image forming process. The MFP 101 is equipped with a plurality of functions for executing a job involving execution of the image forming process, such as a copy function, a scan function, and a FAX function. The MFP 101 is further equipped with the interactive agent function. By using the interactive agent function, a user can provide a job execution instruction and a job setting instruction only by uttering the content of the instruction. Upon receipt of voice uttered by the user, the MFP 101 transmits a user operation request expressed in a natural language by the received voice to a natural language-processing service 102. The natural language-processing service 102 is a module as a component of a cloud 103. Upon receipt of the user operation request from the MFP 101, the natural language-processing service 102 performs natural language processing based on the received user operation request, and analyzes words and phrases included in the voice uttered by the user. Further, the natural language-processing service 102 transmits a result of the analysis to a multifunction peripheral management service 104. Similar to the natural language processing service 102, the multifunction peripheral management service 104 is a module as a component of the cloud 103. The multifunction peripheral management service 104 generates, based on the analysis result received from the natural language-processing service 102, voice identification information from which the MFP 101 can identify the voice, and transmits the generated voice identification information to the MFP 101. The MFP 101 sets, based on the received voice identification information, for example, settings indicated by the voice received by the MFP 101, as function settings information required to execute a job.

Figure 2:
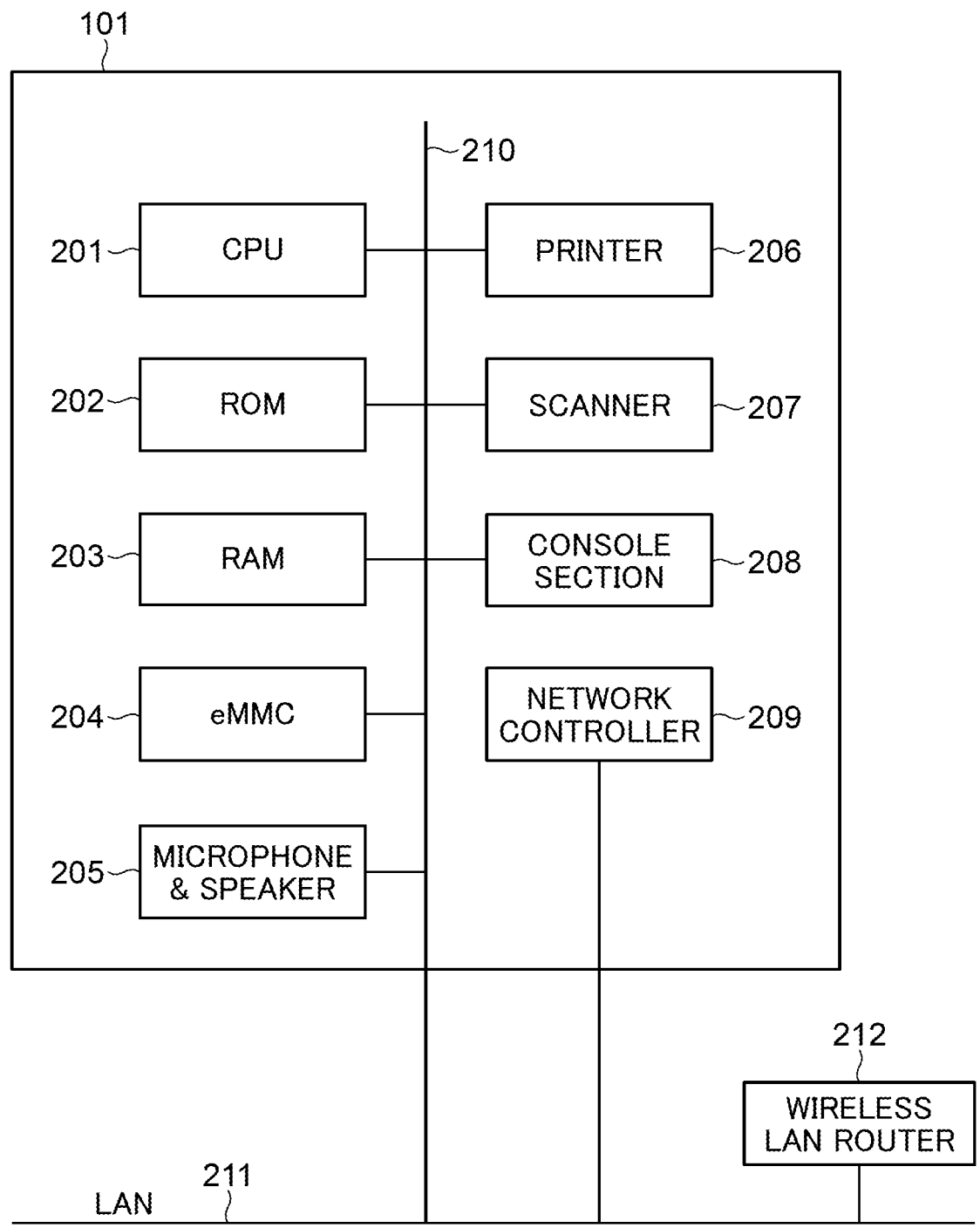
FIG. 2 is a schematic block diagram showing a hardware configuration of the MFP appearing in FIG. 1.

FIG. 2 is a schematic block diagram showing a hardware configuration of the MFP 101 appearing in FIG. 1. Referring to FIG. 2, the MFP 101 includes a CPU 201, a ROM 202, a RAM 203, an eMMC 204, a microphone and speaker 205, a printer 206, a scanner 207, a console section 208, and a network controller 209. The CPU 201, the ROM 202, the RAM 203, the eMMC 204, the microphone and speaker 205, the printer 206, the scanner 207, the console section 208, and the network controller 209 are interconnected via a bus 210.

The CPU 201 controls the overall operation of the MFP 101. The CPU 201 performs various controls, such as scan control, print control, and transmission control, by loading programs stored in the ROM 202 or the eMMC 204 into the RAM 203. The RAM 203 is a memory used as a work area and the like when the CPU 201 executes the programs. The eMMC 204 stores image data and various programs. The microphone and speaker 205 receives voice uttered by a user. Further, the microphone and speaker 205 outputs a response message to the voice received from the user as voice.

The printer 206 performs a print process based on image data transferred via the bus 210. The scanner 207 reads a document placed thereon, and generates image data. The console section 208 includes a display section (not shown), hard keys (not shown), and so forth. The display section also operates as a touch panel which can be operated by a finger of a user. The network controller 209 includes an NIC (Network Interface Card), not shown, for connecting to a LAN 211.

Figure 3:
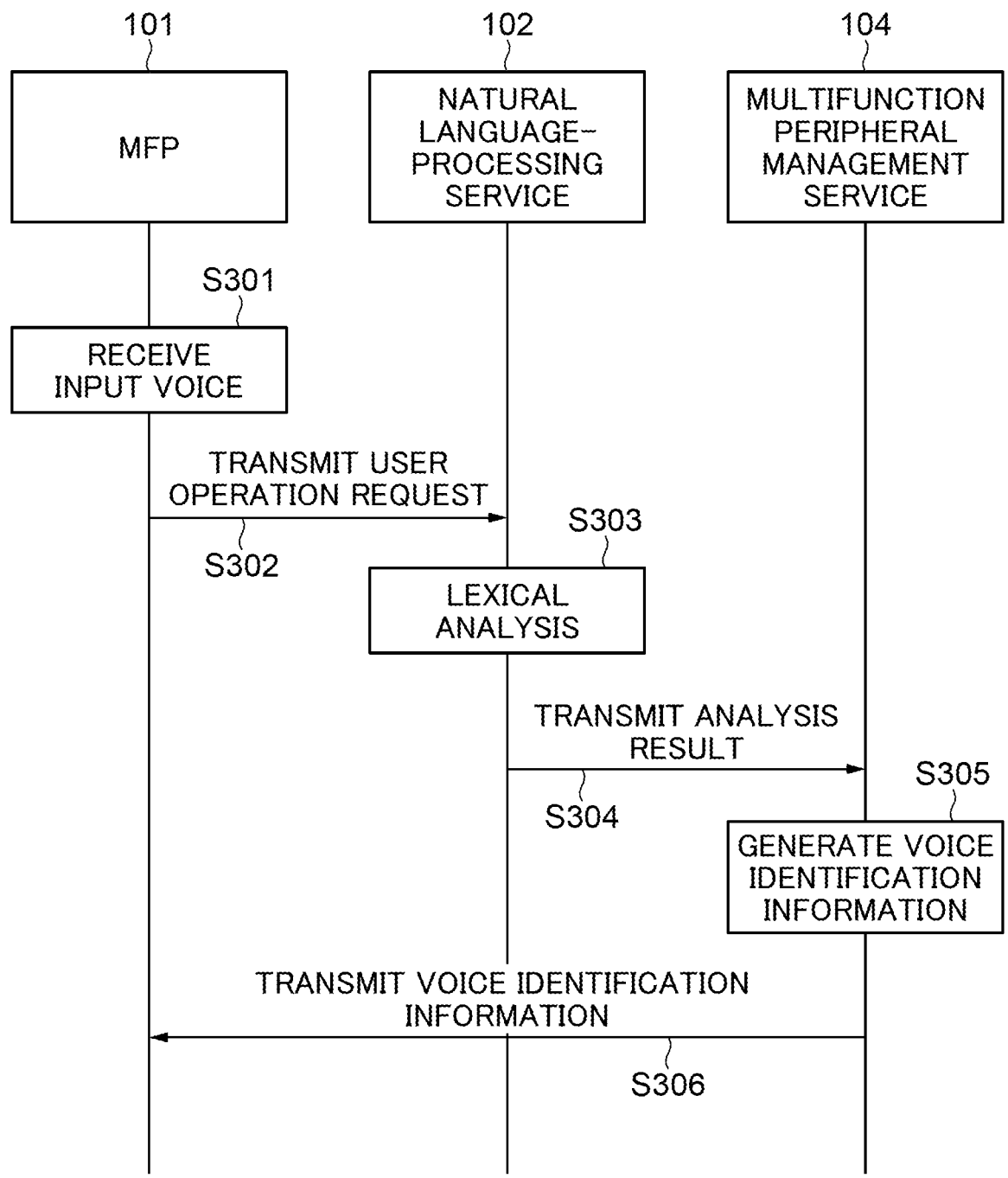
FIG. 3 is a sequence diagram of a voice identification information generation process performed by the MFP, a natural language-processing service, and a multifunction peripheral management service, appearing in FIG. 1.

FIG. 3 is a sequence diagram of a voice identification information generation process performed by the MFP 101, the natural language-processing service 102, and the multifunction peripheral management service 104, appearing in FIG. 1. The process in FIG. 3 is executed when voice is received by the microphone and speaker 205.

Referring to FIG. 3, when the MFP 101 receives voice via the microphone and speaker 205 (step S301), the MFP 101 transmits a user operation request expressed in a natural language by the received voice to the natural language-processing service 102 (step S302). The natural language-processing service 102 performs natural language processing based on the received user operation request, and analyzes words and phrases included in the voice received via the microphone and speaker 205 (step S303). Then, the natural language-processing service 102 transmits a result of the analysis to the multifunction peripheral management service 104 (step S304). The multifunction peripheral management service 104 generates voice identification information based on the received analysis result (step S305), and transmits the generated voice identification information to the MFP 101 (step S306). The MFP 101 identifies the instruction of the user based on the received voice identification information, and outputs a response message as a voice message to the identified instruction from the microphone and speaker 205. Thus, in the present embodiment, by executing the process in FIG. 3, the MFP 101 can acquire, whenever voice is received via the microphone and speaker 205, the voice identification information of the received voice from the multifunction peripheral management service 104, and grasp the content of each voice received via the microphone and speaker 205 based on the acquired voice identification information. In the following description, explanation of operations of the process described with reference to FIG. 3 is omitted, and the description is given assuming that when the MFP 101 receives voice via the microphone and speaker 205, the MFP 101 acquires the voice identification information of the received voice from the multifunction peripheral management service 104.

Next, interaction between a user and the MFP 101 performed when the user instructs execution of a job using the interactive agent function will be described.

Figure 4:
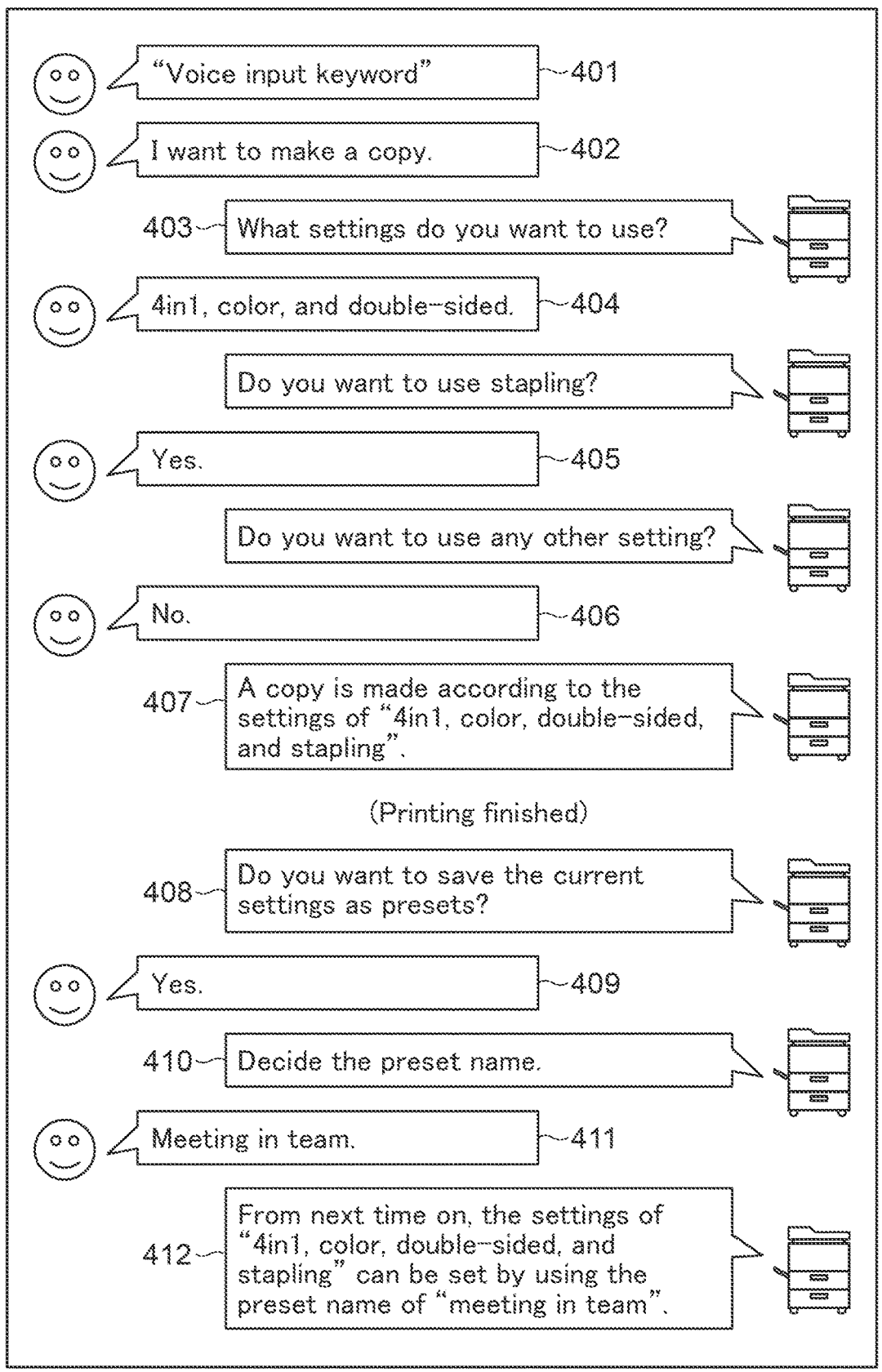
FIG. 4 is a diagram illustrating interaction between a user and the MFP appearing in FIG. 1.

Referring to FIG. 4, when the MFP 101 receives a voice message 401 including a predetermined voice input keyword for starting a voice input operation and a voice message 402 indicating use of the copy function via the microphone and speaker 205, the MFP 101 outputs a voice message 403 for prompting the user to set function settings information of the copy job from the microphone and speaker 205. The function settings information of the copy job is hereinafter referred to as the copy settings information. After that, upon receipt of voice messages 404 to 406 concerning the copy settings information via the microphone and speaker 205, the MFP 101 sets "4in1", "color", "double-sided", and "stapling" as the copy settings information, based on the voice messages 404 to 406. The MFP 101 outputs a voice message 407 indicating the set settings from the microphone and speaker 205. Further, the MFP 101 executes the copy job based on the set copy settings information. When execution of the copy job is completed, the MFP 101 outputs a voice message 408 to prompt the user to select whether or not to save the function settings information used in the executed copy job as presets. Upon receipt of a voice message 409 from the user to the effect that the used function settings information is to be saved via the microphone and speaker 205, the MFP 101 outputs a message 410 for prompting the user to set a preset name for the presets from the microphone and speaker 205. Then, upon receipt of a voice message 411 indicating a preset name from the user via the microphone and speaker 205, the MFP 101 registers the received preset name in association with the above-mentioned function settings information. This enables the user, from next time on, to set the function settings information, which is associated with the preset name, for the MFP 101, only by uttering the preset name. Note that the registered information is stored in the ROM 202 or the like. Further, the MFP 101 outputs a voice message 412 from the microphone and speaker 205, to the effect that the user can call the function settings information by uttering the preset name from next time on. At this time, the MFP 101 outputs "4in1", "color", "double-sided", and "stapling" as the specific values of the function settings information, and "meeting in team" as the preset name, from the microphone and speaker 205.

Figure 5:
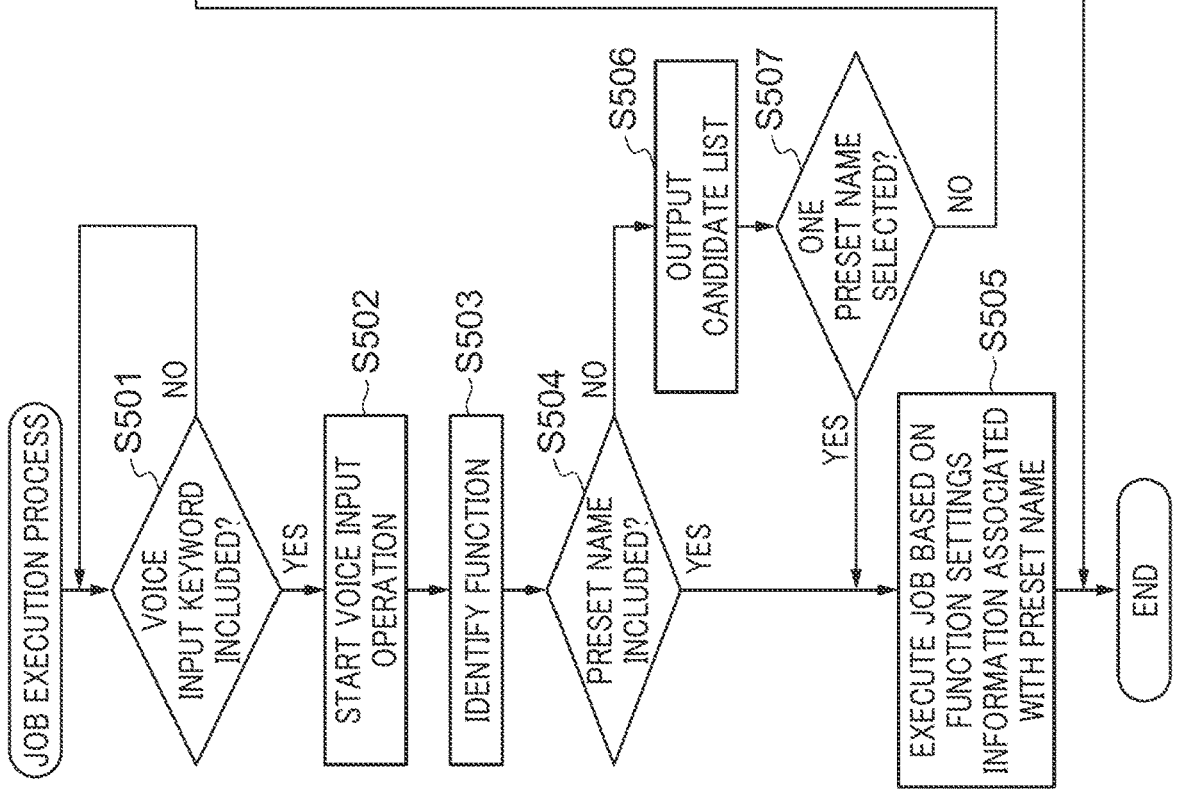
FIG. 5 is a flowchart of a job execution process performed by the MFP appearing in FIG. 1.

FIG. 5 is a flowchart of a job execution process performed by the MFP 101 appearing in FIG. 1. The process in FIG. 5 is performed by the CPU 201 that executes a program stored in the ROM 202 or the eMMC 204. The process in FIG. 5 is executed when the MFP 101 is started, for example.

Figure 6:
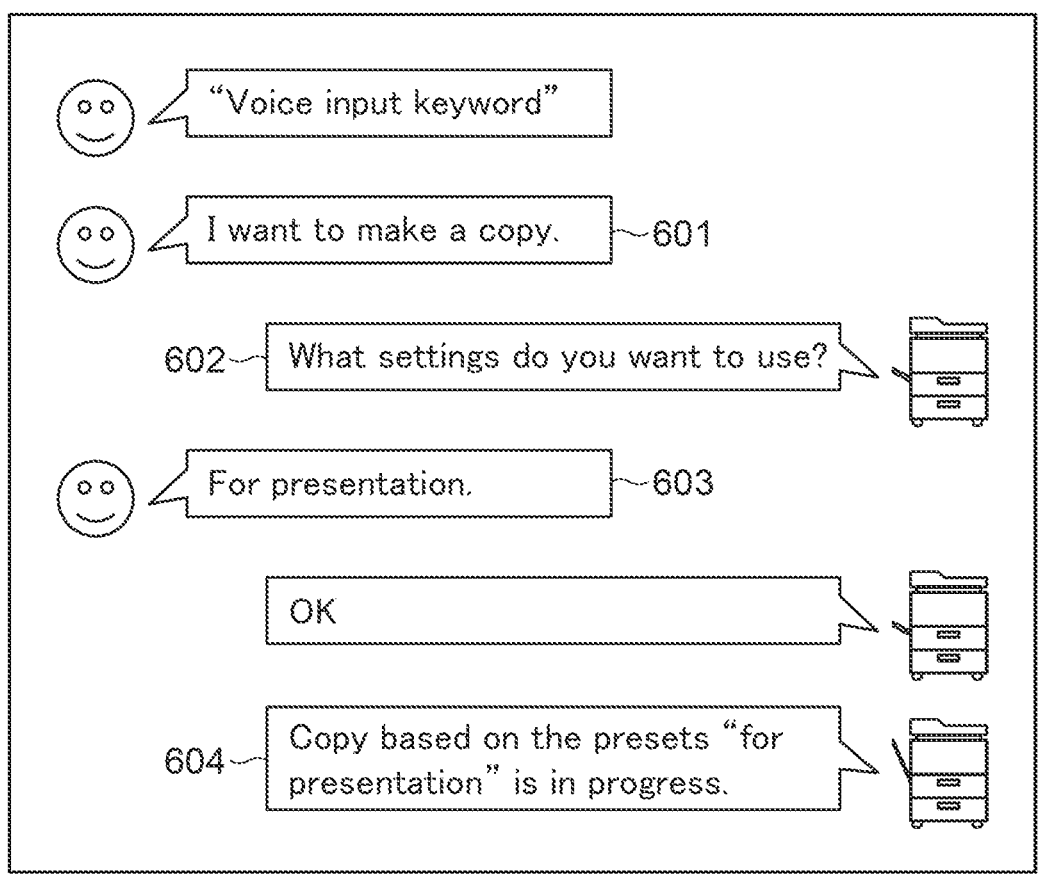
FIG. 6 is a diagram illustrating interaction between a user and the MFP appearing in FIG. 1.

Referring to FIG. 5, first, upon receipt of voice via the microphone and speaker 205, the CPU 201 determines whether or not a predetermined voice input keyword is included in the received voice, based on the voice identification information of the received voice, which is received from the multifunction peripheral management service 104 (step S501). If the predetermined voice input keyword is included in the received voice (YES to the step S501), the CPU 201 starts the voice input operation (step S502). Then, upon receipt of other voice via the microphone and speaker 205, the CPU 201 identifies a function designated by the user based on the voice identification information of the received voice (step S503). For example, in a case where a voice message 601 in FIG. 6 is received, the CPU 201 identifies the function designated by the user as the copy function based on the voice identification information of the voice message 601. Then, the CPU 201 outputs a voice message 602 in FIG. 6 for prompting the user to set the function settings information of the job using the identified function from the microphone and speaker 205. After that, upon receipt of other voice via the microphone and speaker 205, the CPU 201 determines whether or not a preset name registered in advance is included in the received voice (step S504).

If it is determined in the step S504 that a preset name registered in advance is included in the received voice (see e.g. a voice message 603 in FIG. 6), the CPU 201 sets the function settings information associated with the preset name. The function settings information includes a plurality of types of settings required to execute the job, such as the copy settings information included in the voice message 412 appearing in FIG. 4. Then, the CPU 201 executes the job based on the set function settings information (step S505). Further, the CPU 201 outputs a voice message 604 to the effect that the job is being executed based on the function settings information associated with the preset name, followed by terminating the present process.

Figure 7:
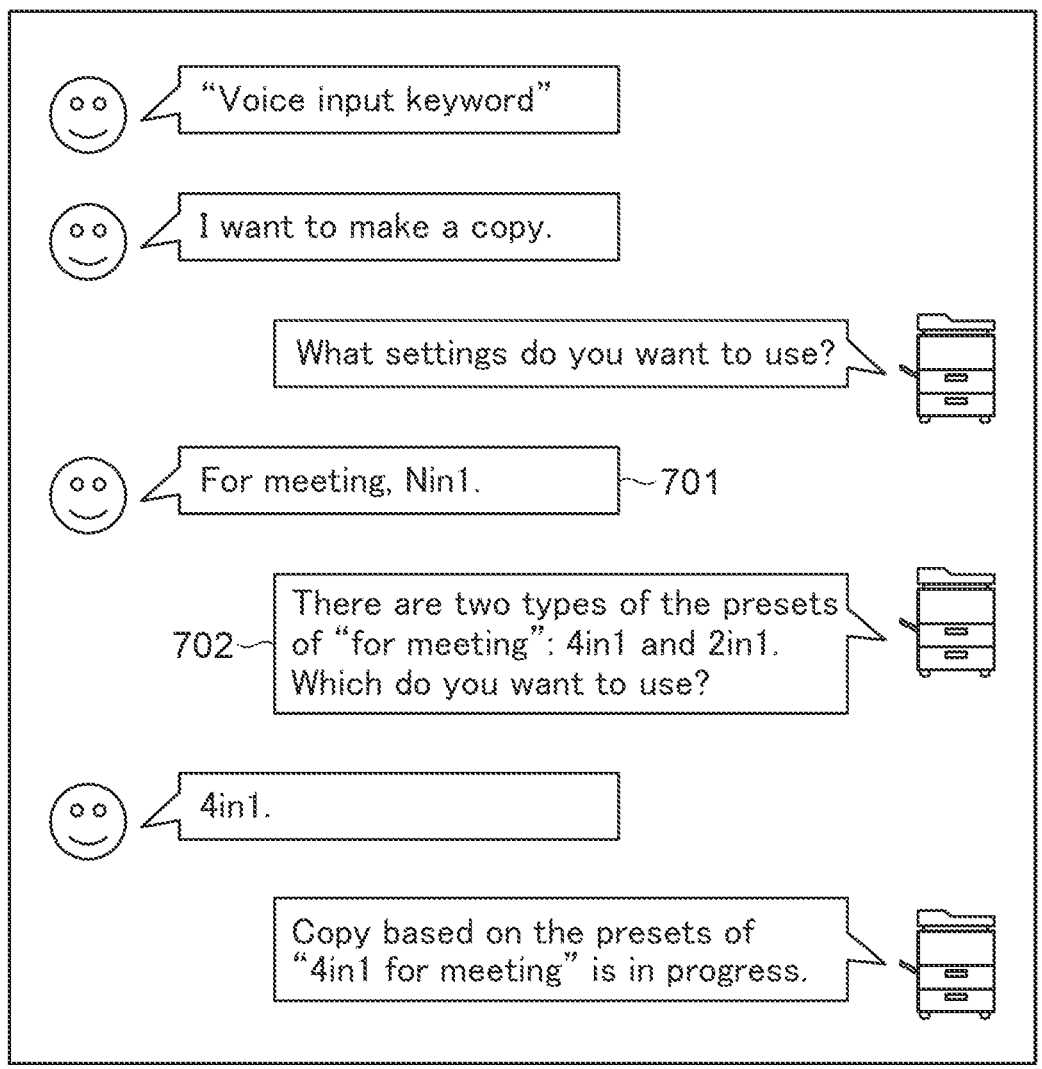
FIG. 7 is a diagram illustrating interaction between a user and the MFP appearing in FIG. 1.

If it is determined in the step S504 that no preset name registered in advance is included in the received voice (see e.g. a voice message 701 in FIG. 7), the CPU 201 outputs a candidate list of preset names resembling words included in the received voice (step S506). For example, in a case where the voice message 701 including words of "for meeting" is received via the microphone and speaker 205 in a state in which "4in1 for meeting" and "2in1 for meeting" have been registered in advance as the preset names, the CPU 201 outputs a voice message 702 in FIG. 7, including "4in1 for meeting" and "2in1 for meeting" from the microphone and speaker 205 as the candidate list of the preset names. After that, upon receipt of other voice via the microphone and speaker 205, the CPU 201 determines whether or not one of the preset names is selected from the candidate list based on the voice identification information of the received voice (step S507).

If it is determined in the step S507 that one of the preset names is selected from the candidate list, the CPU 201 sets the function settings information associated with the selected preset name, and executes the step S505.

If it is determined in the step S507 that none of the preset names are selected from the candidate list, the CPU 201 sets the function settings information without using a preset name. More specifically, as shown in FIG. 4, the CPU 201 interactively confirms settings required to execute the job, and sets a plurality of types of settings indicated by voice received via the microphone and speaker 205 as the function settings information. The CPU 201 executes the job based on the set function settings information (step S508). Then, the CPU 201 outputs the voice message 408 from the microphone and speaker 205 to prompt the user to select whether or not to save the function settings information used in the job as presets. After that, upon receipt of other voice via the microphone and speaker 205, the CPU 201 determines whether or not to save the function settings information used in the job as presets based on the voice identification information of the received voice (step S509).

If it is determined in the step S509 that the function settings information used in the job is not to be saved as presets, the CPU 201 terminates the present process. If it is determined in the step S509 that the function settings information used in the job is to be saved as presets, the CPU 201 determines whether or not voice indicating a preset name to be associated with the function settings information used in the job has been received via the microphone and speaker 205 (step S510).

If it is determined in the step S510 that voice indicating a preset name to be associated with the function settings information has been received via the microphone and speaker 205, the CPU 201 registers the preset name indicated by the received voice in association with the function settings information (step S511). Then, the CPU 201 terminates the present process.

If it is determined in the step S510 that voice indicating no preset name to be associated with the function settings information has been received via the microphone and speaker 205, the CPU 201 determines whether or not a predetermined time period set in advance has elapsed after the last voice was received via the microphone and speaker 205 (step S512).

If it is determined in the step S512 that the predetermined time period has not elapsed after the last voice was received via the microphone and speaker 205, the CPU 201 returns to the step S510. If it is determined in the step S512 that the predetermined time period has elapsed after the last voice was received via the microphone and speaker 205, the CPU 201 terminates the present process.

According to the above-described embodiment, in a case where a preset name is included in the received voice, a job is executed based on a plurality of types of settings registered in advance in association with the preset name. That is, when a user instructs execution of a job requiring setting of a plurality of types of settings by using the interactive aunt function, the user is not required to utter the plurality of types of settings for the job. This makes it possible to reduce time and efforts required for the user to instruct execution of a job by using the interactive agent function, and thereby makes it possible to improve the usability of the interactive agent function.

Further, in the above-described embodiment, after execution of a job is completed, whether or not to register a preset name to be associated with the plurality of types of settings used for execution of the job is selected by the user. This makes it possible to reflect the user's intention with respect to registration of the preset name.

Further, in the above-described embodiment, when registering a preset name, the voice message 412 including all settings to be associated with the preset name to be registered is output from the microphone and speaker 205. This enables, when registering a preset name, the user to grasp the settings to be associated with the preset name to be registered.

In the above-described embodiment, the plurality of settings are settings required to execute the image forming process. Therefore, it is possible to reduce time and efforts required for a user to instruct execution of a job involving execution of the image forming process by using the interactive aunt function.

Figure 9:
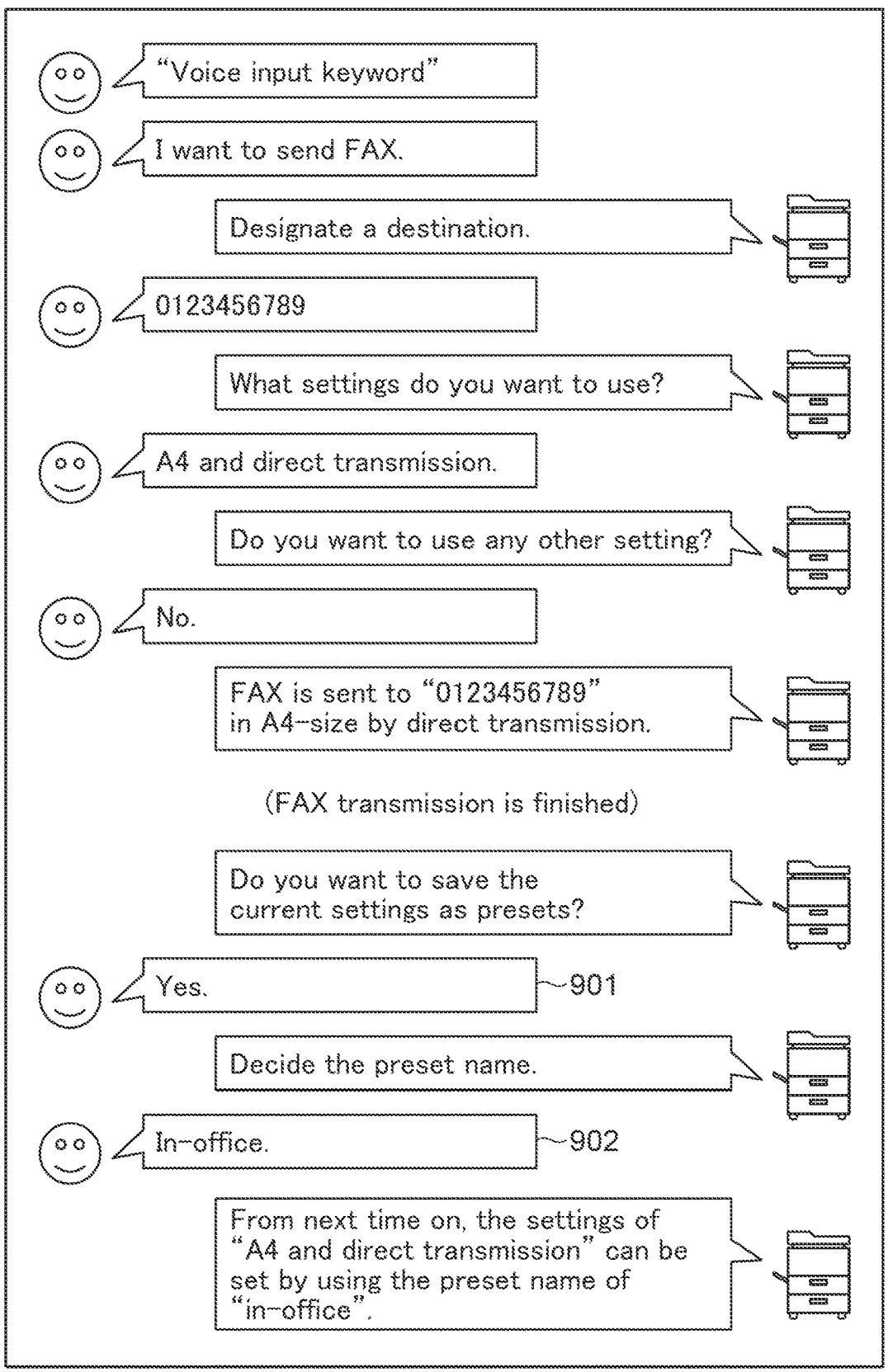
FIG. 9 is a diagram illustrating interaction between a user and the MFP, concerning execution of a FAX job.

The present invention is described using the above-described embodiment, but is not limited to the above-described embodiment. For example, the function settings information associated with a preset name may be function settings information other than the copy settings information, i.e. function settings information of a job using any of functions equipped in the MFP 101 shown in FIG. 8, such as the copy function, the FAX function, a scan-and-transmission function, a scan-and-storage function, a function of using a stored file, a reception tray function, a secure print function, and a print function. For example, when a voice message 901 in FIG. 9 to the effect that the function settings information used in a FAX job is to be saved as presets is received from a user via the microphone and speaker 205, and then a voice message 902 indicating a preset name is received from the user via the microphone and speaker 205, the MFP 101 registers the preset name indicated by the voice message 902 in association with the function settings information used in the FAX job.

Further, in the above-described embodiment, the MFP 101 may be equipped with an advance notification function. The advance notification function is a function for outputting, in a case where a preset name is included in voice received from a user as a response to a message for prompting the user to set the function settings information of a job, a plurality of types of settings registered in advance in association with the preset name from the microphone and speaker 205 before execution of the job. With this function, the user can confirm the function settings information set for job in the MFP 101 before execution of the job.

Figure 10:
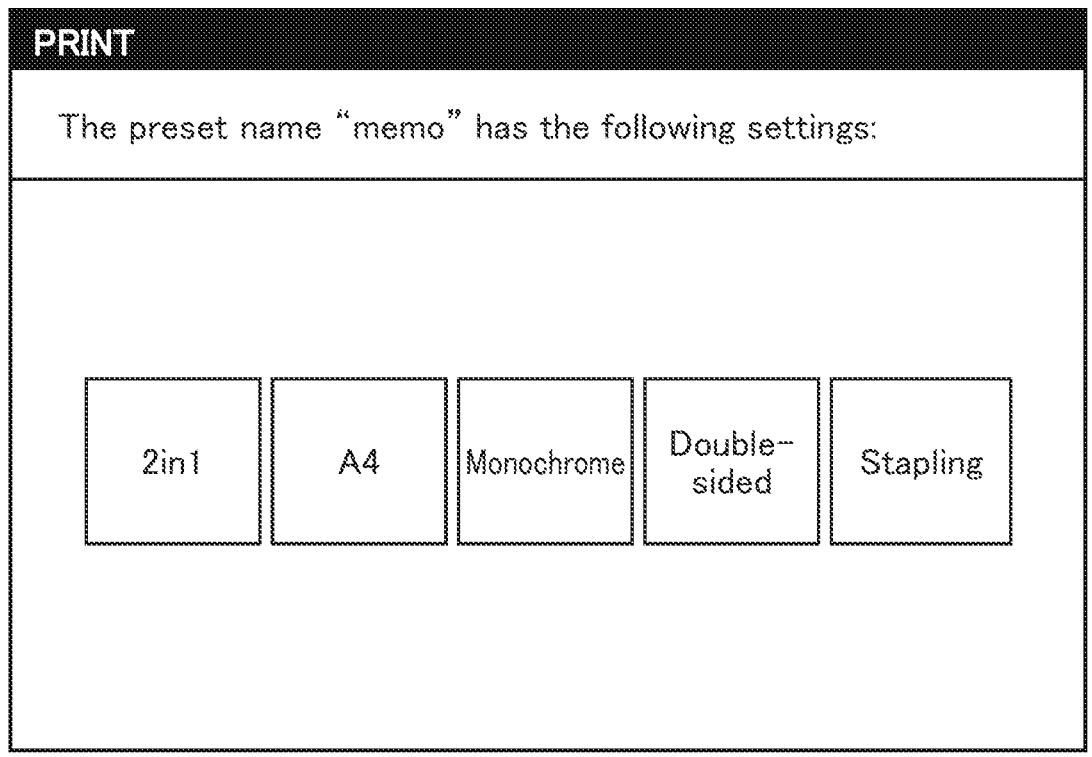
FIG. 10 is a diagram showing an example of a notification from the MFP appearing in FIG. 1.

Further, in the above-described embodiment, in a case where the number of types of settings output from the microphone and speaker 205 by the advance notification function is larger than a predetermined number, the MFP 101 may display the settings on the console section 208 as shown in FIG. 10 without outputting the settings in voice. Further, in this case, the settings may be displayed on the console section 208 while outputting the settings in voice from the microphone and speaker 205. By displaying the settings on the console section 208 as mentioned above, even when the plurality of settings are associated with the preset name as the function settings information, the user can easily grasp the details of the function settings information.

In the above-described embodiment, the preset name and the function settings information may be managed by a management table 1100 shown in FIG. 11, on a user-by-user basis. The management table 1100 is stored in at least one of the MFP 101 and the cloud 103. In the management table 1100, preset names and function settings information are registered in association with each user. For example, even when the same preset name, such as "meeting in team" in FIG. 11, is registered for different users, a and c, items of the function settings information which have different contents are registered in association with the users a and c, respectively. In a case where a message indicating a preset name is received via the microphone and speaker 205, the MFP 101 identifies a user based on login information used when the user logged in the MFP 101 or an authentication result of voiceprint authentication of the user. The MFP 101 identifies the function settings information in the management table 1100, which is associated with the preset name indicated by the message received via the microphone and speaker 205 and is related to the identified user, and executes a job using the identified function settings information. By managing the function settings information, on a user-by-user basis, it is possible to improve the usability of the interactive agent function.

Figure 12:
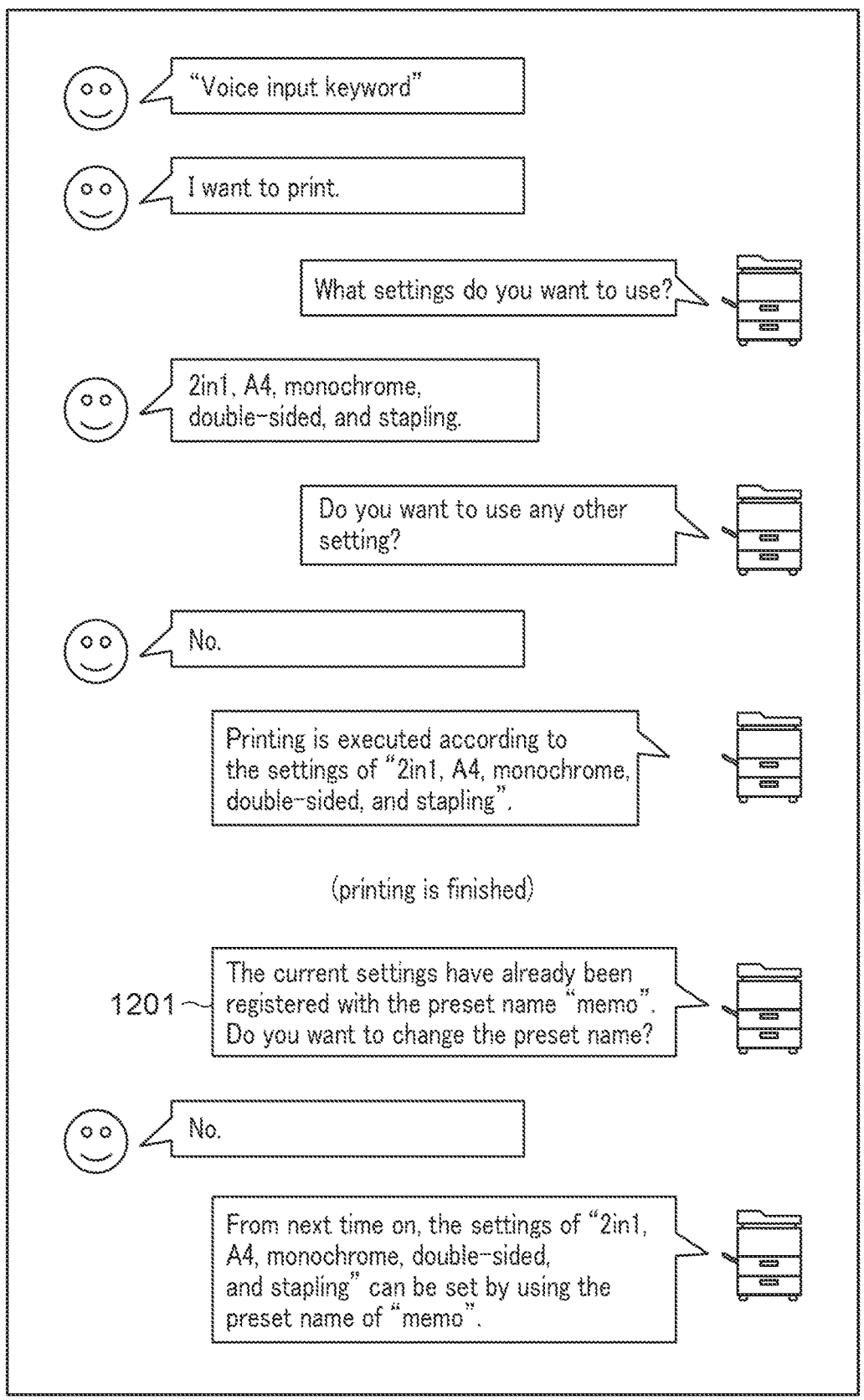
FIG. 12 is a diagram illustrating interaction between a user and the MFP in a case where the function settings information used for execution of a job has already been registered.

In the above-described embodiment, in a case where the function settings information used for execution of a job has already been stored as presets, the MFP 101 may output a message 1201 in FIG. 12 from the microphone and speaker 205 to prompt the user to select whether or not to change the preset name associated with the function settings information.

Further, in the above-described embodiment, ON/OFF of the advance notification function may be caused to be set by a user. A setting indicative of ON or OFF of the advance notification function, which is set by the user, is stored in the ROM 202 or the like. In a case where the MFP 101 has the advance notification function set to ON, if a preset name is included in voice received from a user as a response to a message for prompting the user to set the function settings information of a job, the MFP 101 outputs e.g. a message 1301 in FIG. 13A from the microphone and speaker 205 before execution of the job. The message 1301 includes the function settings information registered in association with the preset name included in the received voice. On the other hand, in a case where the MFP 101 has the advance notification function set to OFF, if a preset name is included in voice received from a user as a response to a message for prompting the user to set the function settings information of a job, for example, as shown in FIG. 13B, the MFP 101 executes the job without outputting a message requesting the user to confirm the function settings information registered in association with the preset name included in the received voice, from the microphone and speaker 205.

Figure 14:
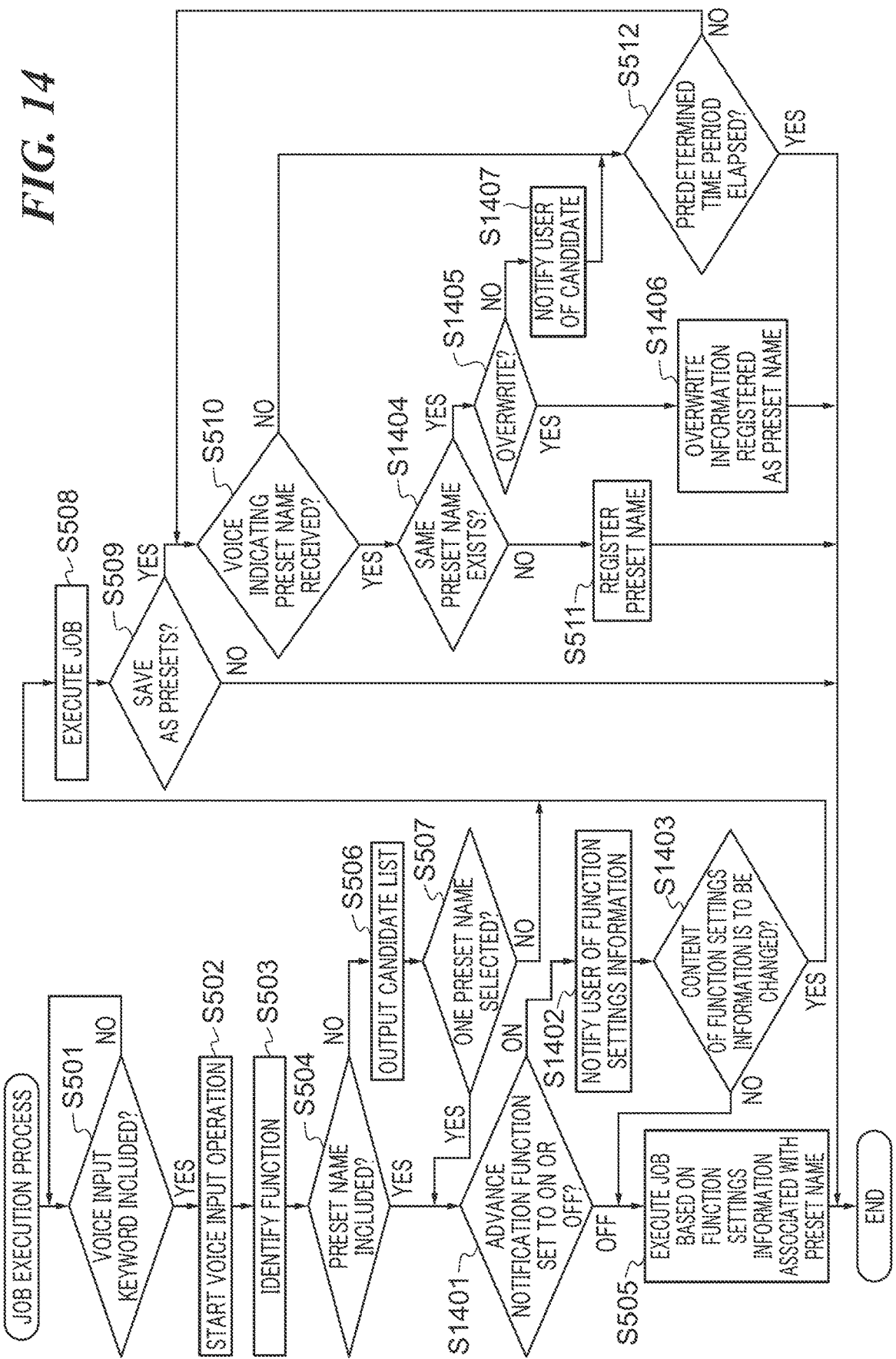
FIG. 14 is a flowchart of a variation of the job execution process in FIG. 5.

FIG. 14 is a flowchart of a variation of the job execution process in FIG. 5. The process in FIG. 14 is also performed by the CPU 201 that executes a program stored in the ROM 202 or the eMMC 204. The process in FIG. 14 is also executed when the MFP 101 is started, for example.

Referring to FIG. 14, the CPU 201 executes the steps S501 to S504. If it is determined in the step S504 that no preset name is included in the received voice, the CPU 201 executes the steps S506 and S507.

If it is determined in the step S507 that one of the preset names is selected from the candidate list, or if it is determined in the step S504 that a preset name registered in advance is included in the received voice, the CPU 201 determines whether the advance notification function is set to ON or OFF (step S1401).

Figure 13A:
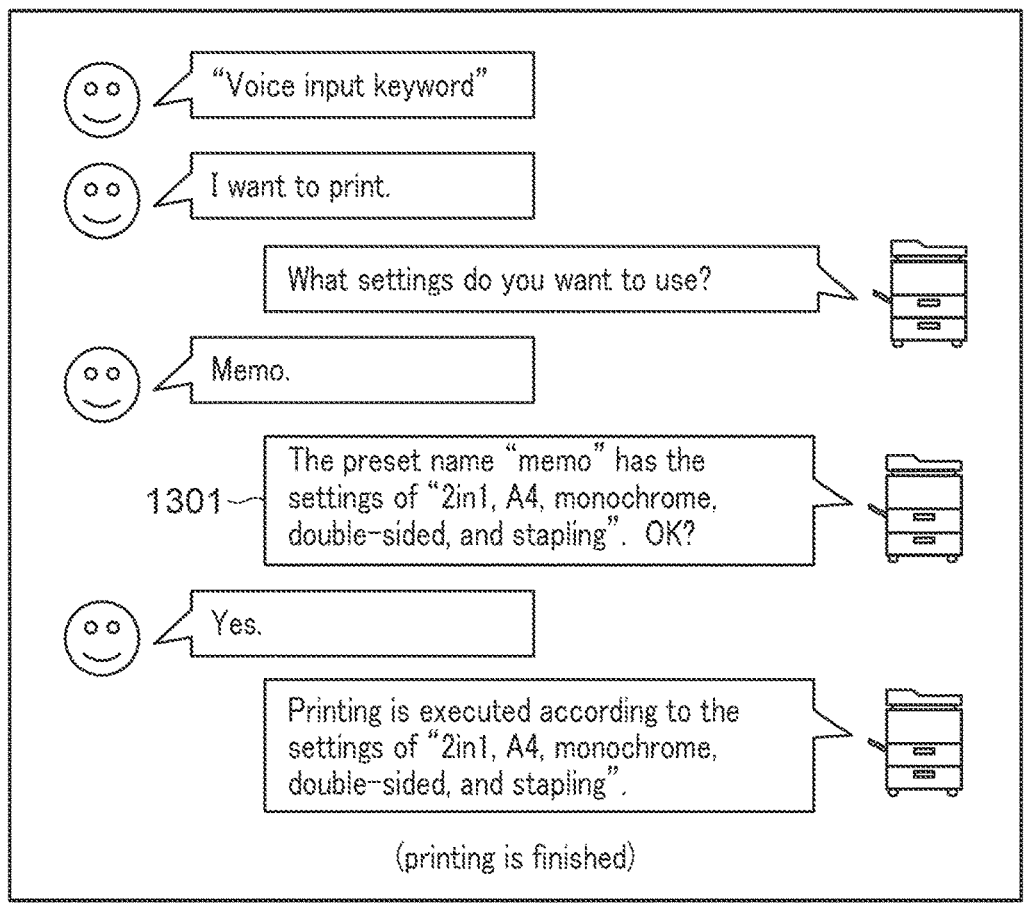
FIGS. 13A and 13B are diagrams useful in explaining an advance notification function equipped in the MFP appearing in FIG. 1.
Figure 13B:
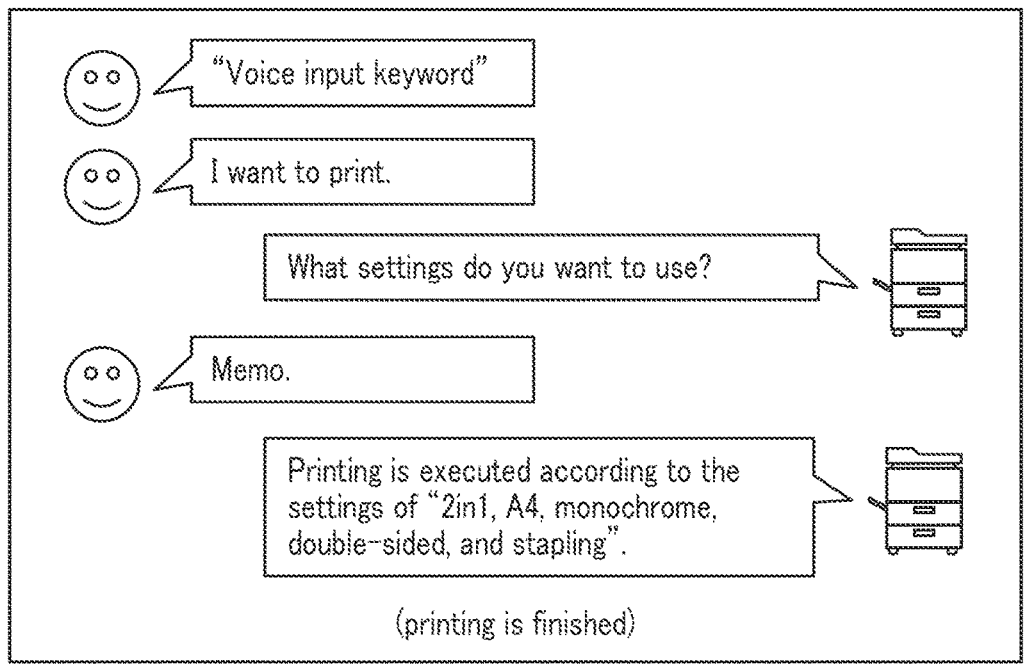

If it is determined in the step S1401 that the advance notification function is set to ON, the CPU 201 notifies the user of a message requesting the user to confirm the function settings information registered in advance in association with the preset name included in the received voice, for example, the message 1301 in FIG. 13A (step S1402). The notification in the step S1402 is performed by at least one of the voice output from the microphone and speaker 205 and the message displayed on the console section 208. Then, upon receipt of other voice via the microphone and speaker 205, the CPU 201 determines whether or not to change the content of the function settings information based on the voice identification information of the received voice (step S1403).

If it is determined in the step S1403 that the content of the function settings information is not to be changed, or if it is determined in the step S1401 that the advance notification function is set to OFF, the CPU 201 executes the step S505 et seq. If it is determined in the step S1403 that the content of the function settings information is to be changed, or if it is determined in the step S507 that none of the preset names is selected from the candidate list, the CPU 201 executes the steps S508 to S510.

If it is determined in the step S510 that voice indicating a preset name associated with the function settings information used in the job has been received via the microphone and speaker 205, the CPU 201 determines whether or not the same preset name as the preset name indicated by the received voice has been registered (step S1404).

If it is determined in the step S1404 that the same preset name as the preset name indicated by the received voice has not been registered, the CPU 201 executes the step S511 et seq. If it is determined in the step S1404 that the same preset name as the preset name indicated by the received voice has been registered, the CPU 201 outputs e.g. a message 1501 in FIG. 15 from the microphone and speaker 205 to prompt the user to select whether or not to overwrite the information registered in association with the preset name (step S1405). Overwriting of the information registered in association with the preset name refers to processing for updating the function settings information associated with the preset name in advance to the function settings information used in the step S508.

In the step S1405, when a message to the effect that the information registered in association with the preset name is to be overwritten is received from the user via the microphone and speaker 205, the CPU 201 overwrites the information registered in association with the preset name (step S1406), followed by terminating the present process.

Figure 15:
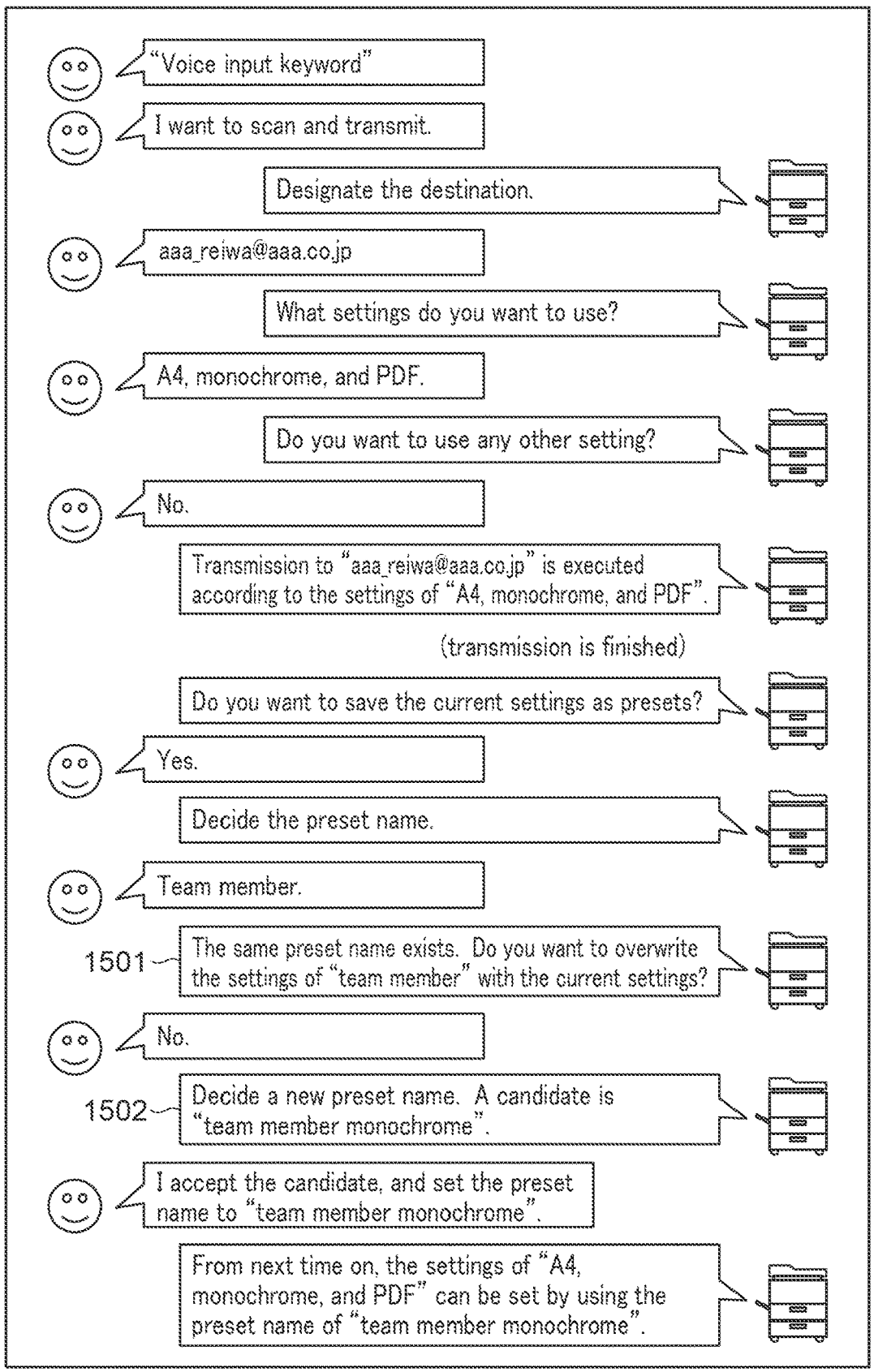
FIG. 15 is a diagram illustrating interaction between a user and the MFP appearing in FIG. 1.

In the step S1405, when a message to the effect that the information registered in association with the preset name is not to be overwritten is received from the user via the microphone and speaker 205, the CPU 201 outputs e.g. a message 1502 in FIG. 15 from the microphone and speaker 205 to notify the user of a candidate of the preset name (step S1407). In the step S1407, the CPU 201 generates a candidate of the preset name, including a characteristic character string, based on a difference between the preset name indicated by the received voice and the preset name already registered, and notifies the user of the generated candidate of the preset name. The notification in the step S1407 is performed by at least one of the voice output from the microphone and speaker 205 and the message displayed on the console section 208. Then, the CPU 201 executes the step S512.

Although in the above-described embodiment, the description is given of the case where voice uttered by a user is received by the microphone and speaker 205 of the MFP 101, voice uttered by the user may be received by a mobile terminal (not shown), such as a smart speaker. Upon receipt of voice uttered by the user, the mobile terminal transmits the user operation request to the MFP 101 e.g. via a wireless LAN router 212. The MFP 101 transfers the received user operation request to the natural language-processing service 102 as the processing to be executed in the step S302. The natural language-processing service 102 executes the steps S303 and S304 based on the received user operation request, and the multifunction peripheral management service 104 executes the steps S305 and S306, and transmits the voice identification information to the MFP 101.

Alternatively, upon receipt of voice uttered by the user, the mobile terminal transmits the user operation request to the natural language-processing service 102 e.g. via the wireless LAN router 212. The natural language-processing service 102 executes the steps S303 and S304 based on the received user operation request, and the multifunction peripheral management service 104 executes the steps S305 and S306, and transmits the voice identification information to the MFP 101.

Figure 16:
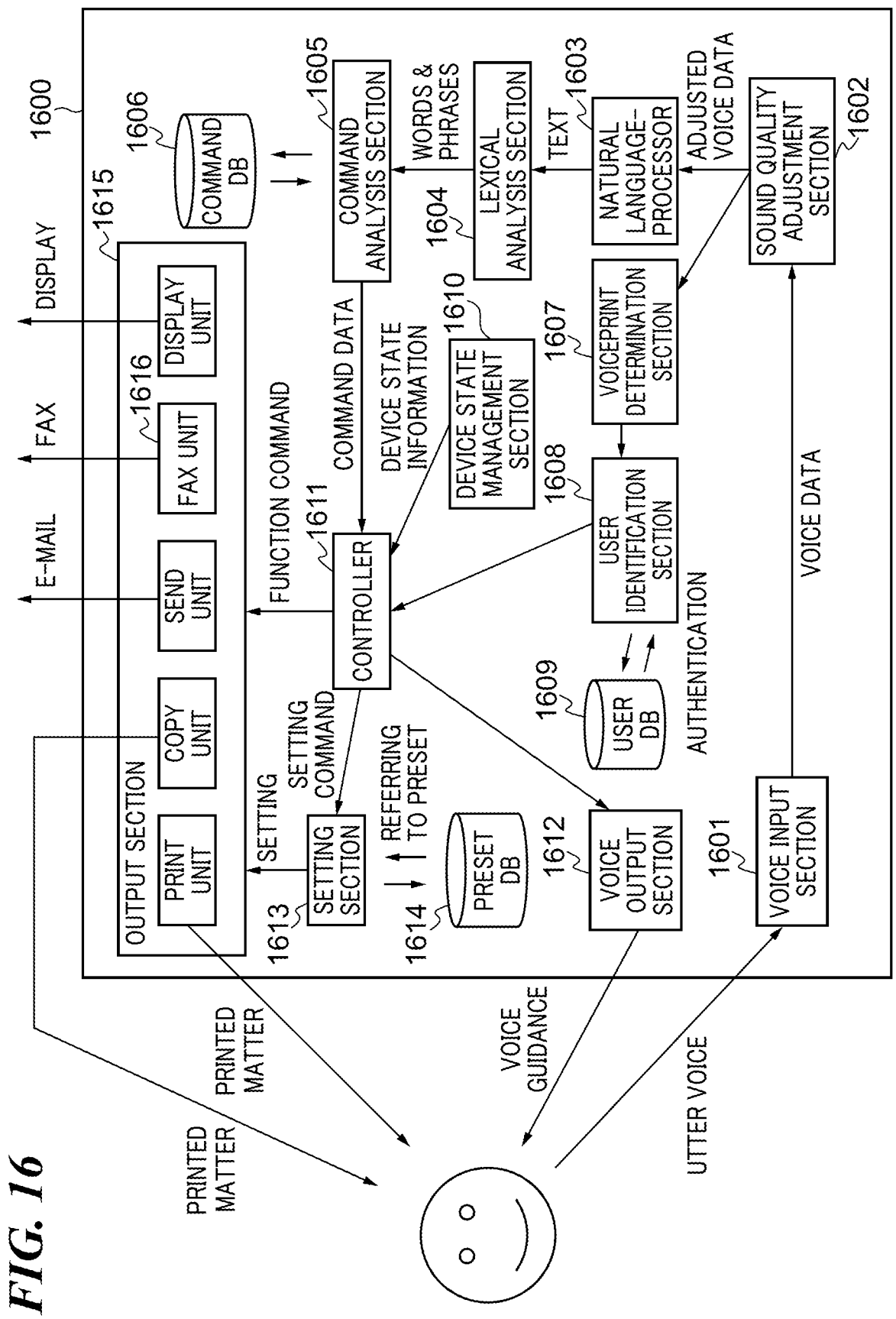
FIG. 16 is a functional block diagram of an MFP equipped with the natural language-processing service and the multifunction peripheral management service.

Further, in the above-described embodiment, the MFP may be equipped with the functions of the natural language-processing service 102 and the multifunction peripheral management service 104. FIG. 16 is a functional block diagram of an MFP 1600 equipped with the natural language-processing service 102 and the multifunction peripheral management service 104.

A voice input section 1601 transmits, upon receipt of voice uttered by a user, data related to the received voice (hereinafter referred to as the "voice data") to a sound quality adjustment section 1602. The sound quality adjustment section 1602 transmits the voice data having an adjusted sound quality to a natural language processor 1603 and a voiceprint determination section 1607. The natural language processor 1603 converts the voice data having the adjusted sound quality to text data and transmits the text data to a lexical analysis section 1604. The lexical analysis section 1604 converts the received text data to words and phrases and transmits the words and phrases to a command analysis section 1605. The command analysis section 1605 analyzes the received words and phrases to identify an instruction indicated by the voice uttered by the user. The command analysis section 1605 stores command data indicating the identified instruction in a command DB 1606 and transmits the command data to a controller 1611. The voiceprint determination section 1607 determines a voiceprint based on the voice data having the adjusted sound quality, generates information on the identified user (hereinafter referred to as the "user information") based on a result of the voiceprint determination, and transmits the generated user information to a user identification section 1608. The user identification section 1608 performs user authentication based on the user information received from the voiceprint determination section 1607 and user registration information registered in a user DB 1609 in advance. The user identification section 1608 transmits the user information and user identification information indicative of a result of the user authentication to the controller 1611. A device state management section 1610 transmits device state information of the MFP 1600 to the controller 1611. The controller 1611 transmits a response command to a voice output section 1612, a setting command related to settings to be used to a setting section 1613, and a function command indicative of a function to be used to an output section 1615. The setting section 1613 transmits and receives information on presets to and from a preset DB 1614, and transmits function settings information associated with a preset name indicated by voice received e.g. by the voice input section 1601 to the output section 1615. The output section 1615 executes a job using the function settings information acquired from the setting section 1613 by the function indicated by the function command. For example, the output section 1615 transmits FAX data to an external apparatus using the function settings information acquired from the setting section 1613 by a FAX unit 1616 indicated by the function command.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-165379 filed Sep. 4, 2018, and Japanese Patent Application No. 2019-121813 filed Jun. 28, 2019, which are hereby incorporated by reference herein in their entirety.

What is claimed is:

1. An image forming system comprising:
an image forming device configured to form an image on a sheet;
a microphone capable of receiving voice; and
at least one controller configured to function as:
a first unit configured to associate at least one image formation setting acquired based on a first voice input via the microphone with identification information acquired based on a second voice input via the microphone; and
a second unit configured to acquire the at least one image formation setting associated with the identification information, based on a third voice input via the microphone, and cause the image forming device to execute image formation based on the acquired at least one image formation setting,
wherein the at least one controller is configured to function as a third unit configured to prompt via a voice output, after completion of a series of processes for making one or more image formation settings for the image formation, a user to select, via a voice input, whether or not to associate at least one image formation setting used for the image formation with specific identification information.

2. The image forming system according to claim 1, wherein the at least one controller configured to function as a fourth unit is configured to, before associating the at least one image formation setting with the piece of identification information, output all of the at least one image formation setting to be associated with the piece of identification information.

3. The image forming system according to claim 1, wherein the at least one controller configured to function as a fourth unit is configured to, in a case where the third voice includes a specific word corresponding to the identification information, output the at least one image formation setting associated with the identification information, before causing the image forming device to execute image formation based on the at least one image formation setting associated with the identification information.

4. The image forming system according to claim 1, wherein the at least one controller configured to function as a fourth unit is configured to, in a case where the third voice includes a specific word corresponding to a plurality of different items of identification information, output the plurality of different items of identification information as candidates for prompting a user to select one therefrom.

5. The image forming system according to claim 1, wherein the first unit and the second unit are disposed in a server connected via a network,
wherein the first, second, and third voices input via the microphone are transmitted to the first unit and the second unit in the server, and
wherein at least one image formation setting associated with the identification information is transmitted to the image forming device.

6. The image forming system according to claim 1, wherein the microphone is disposed separately from the image forming device, and
wherein voice input to the microphone is transmitted by communication to the image forming device including the first unit and the second unit.

7. The image forming system according to claim 5, wherein the microphone is disposed separately from the image forming device, and
wherein voice input to the microphone is transmitted to the first unit and the second unit in the server.

8. A method of controlling an image forming system including an image forming device configured to form an image on a sheet, and a microphone capable of acquiring voice, comprising:
associating at least one image formation setting acquired based on a first voice input via the microphone with identification information acquired based on a second voice input via the microphone;

acquiring the at least one image formation setting associated with the identification information, based on a third voice input via the microphone, and causing the image forming device to execute image formation based on the acquired at least one image formation setting; and prompting via a voice output, after completion of a series of processes for making one or more image formation settings for the image formation, a user to select, via a voice input, whether or not to associate at least one image formation setting used for the image formation with specific identification information.

9. The method according to claim 8, further comprising, before associating the at least one image formation setting with the piece of identification information, outputting all of the at least one image formation setting to be associated with the piece of identification information.

10. The method according to claim 8, further comprising, in a case where the third voice includes a specific word corresponding to the identification information, outputting the at least one image formation setting associated with the identification information, before causing the image forming device to execute image formation based on the at least one image formation setting associated with the identification information.

11. The method according to claim 8, further comprising, in a case where the third voice includes a specific word corresponding to a plurality of different items of identification information, outputting the plurality of different items of identification information as candidates for prompting a user to select one therefrom.

12. The method according to claim 8, further comprising transmitting the first, second, and third voices input via the microphone to a server connected via a network, and transmitting the at least one image formation setting associated with the identification information to the image forming device.

13. The method according to claim 8, wherein the microphone is disposed separately from the image forming device, and the method further comprising transmitting voice input to the microphone by communication to the image forming device.

14. The method according to claim 12, wherein the microphone is disposed separately from the image forming device, and the method further comprising transmitting voice input to the microphone to the server.

15. A non-transitory computer-readable storage medium storing a computer-executable program for executing a method of controlling an image forming system including an image forming device configured to form an image on a sheet, and a microphone capable of acquiring voice, wherein the method comprises:

associating at least one image formation setting acquired based on a first voice input via the microphone with identification information acquired based on a second voice input via the microphone;

acquiring the at least one image formation setting associated with the identification information, based on a third voice input via the microphone, and causing the image forming device to execute image formation based on the acquired at least one image formation setting; and prompting via a voice output, after completion of a series of processes for making one or more image formation settings for the image formation, a user to select, via a voice input, whether or not to associate at least one image formation setting used for the image formation with specific identification information.

* * * * *